United States Patent [19]

Schmidlin

[11] Patent Number: 4,860,036

[45] Date of Patent: Aug. 22, 1989

[54] DIRECT ELECTROSTATIC PRINTER (DEP) AND PRINTHEAD STRUCTURE THEREFOR

[75] Inventor: Fred W. Schmidlin, Pittsford, N.Y.

[73] Assignee: Xerox Corporation, Stamford, Conn.

[21] Appl. No.: 226,178

[22] Filed: Jul. 29, 1988

[51] Int. Cl.[4] .............................................. G01D 15/00

[52] U.S. Cl. ..................................... 346/159; 346/155

[58] Field of Search ........... 346/159, 158, 155, 139 C; 400/159

[56] References Cited

U.S. PATENT DOCUMENTS 4,568,955 2/1986 Hosoya et al. ...................... 346/159

*Primary Examiner*—Arthur G. Evans

[57] ABSTRACT

Near letter quality (NLQ) characters are formed using direct electrostatic printing (DEP) by providing a printhead structure containing at least three equally spaced rows of equally spaced and staggered apertures. In the preferred embodiment, the printhead structure includes at least four rows of apertures. The number of rows is equal to the distance between aperture centers divided by the diameter of a spot of toner deposited by each of the apertures.

9 Claims, 2 Drawing Sheets

DIRECT ELECTROSTATIC PRINTER (DEP) AND PRINTHEAD STRUCTURE THEREFOR

BACKGROUND OF THE INVENTION

This invention relates to electrostatic printing devices and more particularly to electronically addressable printheads utilized for depositing developer in image configuration on plain paper substrates.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known and utilized form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. Highspeed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

The toner carrying plate of hosoya et al is made of an insulator. The toner carrying plate has a horizontal portion, a vertical portion descending from the right end of the horizontal portion and an inclined portion downwardly inclining from the left end of the horizontal portion. The lower end of the inclined portion is found near the lower end of the inclined bottom of the toner reservoir and immersed in the toner therein. The lower end of the vertical portion is found near the upper end of the inclined portion and above the toner in the reservoir.

The surface of the toner carrying plate is provided with a plurality of uniformly spaced parallel linear electrodes extending in the width direction of the toner carrying plate. At least three AC voltages of different phases are applied to the electrodes. The three-phase AC voltage source provides three-phase AC voltages 120 degrees out of phase from one another. The terminals are connected to the electrodes in such a manner that when the three-phase AC voltages are applied a propagating alternating electric field is generated which propagates along the surface of the toner carrying plate from the inclined portion to the horizontal portion.

The toner which is always present on the surface of lower end of the inclined portion of the toner carrying plate is negatively charged by friction with the surface of the toner carrying plate and by the agitator. When the propagating alternating electric field is generated by the three-phase AC voltages applied to the electrodes, the toner is allegedly transported up the inclined portion of the toner carrying plate while it is oscillated and liberated to be rendered into the form of smoke between adjacent linear electrodes. Eventually, it reaches the horizontal portion and proceeds therealong. When it reaches a development zone facing the recording electrode it is supplied through the opening to the ordinary sheet as recording medium, whereby a visible image is formed. The toner which has not contributed to the formation of the visible image is carried along such as to fall along the vertical portion and then slide down into the bottom of the toner reservoir by the gravitational force to return to a zone, in which the lower end of the inclined portion of the toner carrying plate is found.

U.S. Pat. No. 4,647,179 granted to Fred W. Schmidlin on Mar. 3, 1987 discloses a toner transporting apparatus for use in forming powder images on an imaging surface. The apparatus is characterized by the provision of a travelling electrostatic wave conveyor for the toner particles for transporting them from a toner supply to an imaging surface. The conveyor comprises a linear electrode array consisting of spaced apart electrodes to which a multiphase a.c. voltage is connected such that adjacent electrodes have phase shifted voltages applied thereto which cooperate to form the travelling wave.

U.S. Pat. No. 3,872,361 issued to Masuda discloses an apparatus in which the flow of particulate material along a defined path is controlled electrodynamically by means of elongated electrodes curved concentrically to a path, as axially spaced rings or interwound spirals. Each electrode is axially spaced from its neighbors by a distance about equal to its diameter and is connected with one terminal of a multi-phase alternating high voltage source. Adjacent electrodes along the path are connected with different terminals in a regular sequence, producing a wave-like, nonuniform electric field that repels electrically charged particles axially inwardly and tends to propel them along the path.

U.S. Pat. No. 3,778,678 also issued to Masuda relates to a similar device as that disclosed in the aforementioned '361 patent.

U.S. Pat. No. 3,801,869 issued to Masuda discloses a booth in which electrically charged particulate material is sprayed onto a workpiece having an opposite charge, so that the particles are electrostatically attracted to the workpiece. All of the walls that confront the workpiece are made of electrically insulating material. A grid-like arrangement of parallel, spaced apart electrodes, insulated from each other extends across the entire area of every wall, parallel to a surface of the wall and in intimate juxtaposition thereto. Each electrode is connected with one terminal of an alternating high voltage source, every electrode with a different terminal than each of the electrodes laterally adjacent to it, to produce a constantly varying field that electrodynamically repels particles from the wall. While the primary purpose of the device disclosed is for powder painting, it is contended therein that it can be used for electrostatic or electrodynamic printing.

The Masuda devices all utilize a relatively high voltage source (i.e. 5-10 KV) operated at a relatively low frequency, i.e. 50 Hz, for generating his travelling waves. In a confined area such as a tube or between parallel plates the use of high voltages is tolerable and in the case of the '869 patent even necessary since a high voltage is required to charge the initially uncharged particles.

In U.S. Patent application Ser. No. 374,376, now abandoned and its foreign counterpart filed in Japan on May 7, 1981 there is disclosed a device comprising an elongated conduit which utilizes travelling waves for transporting toner from a supply bottle to a toner hopper.

U.S. Patent application Ser. No. 946,937 filed in the name of Schmidlin et al and assigned to the same assignee as the instant invention discloses an electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attracted to various apertures thereof from the conveyor.

In another embodiment of the '937 application, a single charged toner conveyor is supplied by a pair of three-phase generators which are biased by a dc source which causes toner of one polarity to travel in one direction on the electrode array while toner of the opposite polarity travels generally in the opposite direction.

In an additional embodiment disclosed in the '937 application, a toner charging devices is provided which charges uncharged toner particles to a level sufficient for movement by one or the other of the aforementioned charged toner conveyors.

The toner in a device such as disclosed in the '937 application is extracted from the "tops" of the clouds via the fringe fields that extend into the clouds from around the apertures. The efficiency of toner usage in a charged toner conveyor of the type disclosed in the '937 application is currently limited by the relatively dilute toner density in the "tips" of the toner clouds that are transported thereby.

U.S. Patent application Ser. No. 926,129 filed in the name of Fred W. Schmidlin and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign and size toner. To this end, the developer delivery system includes a conventional magnetic brush which delivers toner to a donor roll structure which, in turn, delivers toner to the vicinity of apertures in the printhead structure.

U.S. Patent application Ser. No. 140,266 filed in the name of Fred W. Schmidlin and assigned to the same assignee as the instant invention discloses a direct electrostatic printing apparatus including structure for delivering developer or toner particles to a printhead forming an integral part of the printing device. The printing device includes, in addition to an apertured printhead, a conductive shoe which is suitably biased during a printing cycle to assist in the electrostatic attraction of developer through apertures int he printhead onto the copying medium disposed intermediate the printhead and the conductive shoe. Developer or toner delivered to the printhead via a pair of opposed charged toner or developer conveyors. One of the conveyors is attached to the printhead and has an opening therethrough for permitting passage of the developer or toner from between the conveyors to areas adjacent the apertures in the printhead.

U.S. Patent application Ser. No. 926,158 filed in the name of Fred W. Schmidlin and assigned to the same assignee as the instant invention discloses a direct electrostatic printing apparatus including structure for removing wrong sign developer particles from a printhead forming an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the shoe and an electrical bias suitable for creating an oscillating electrostatic field which effect removal of toner from the printhead is applied to the shoe.

U.S. Patent application D/86121 discloses a direct electrostatic printing (DEP) device wherein printing is optimized by presenting well charged toner to a charged toner conveyor which conveys the toner to an apertured printhead structure for propulsion therethrough. The charged toner conveyor comprises a plurality of electrodes wherein the electrode density (i.e. over 100 electrodes per inch) is relatively large for enabling a high toner delivery rate without risk of air breakdown. The printhead structure is constructed for minimization of aperture clogging. To this end the thickness of the printhead structure is about 0.025 mm and the aperture diameter (i.e. 0.15 mm) is large compared to the printhead thickness.

While working with printhead aperture arrangements of the type described above I discovered that the size of the toner spots are smaller than the size of the aperture. I further discovered that this was due to the focusing effect of the electrostatic field on the toner particles as they are deposited on the imaging substrate. Thus, an aperture having a diameter equal to 0.15 mm produces a spot size of approximately 0.075 mm.

Prior art printhead structures utilize two rows of apertures which of necessity require the apertures to be spaced a finite distance apart from each other. This is because the apertures cannot be touching each other, otherwise there would be a slot instead of a row of apertures. With such a restriction on the positioning (i.e. spacing therebetween) of the apertures together with the size (i.e. half the diameter of the aperture) of the toner spots produced thereby, I have found that it is impossible to obtain full coverage using only two rows. Thus, using a printhead structure with conventionally (i.e. two staggered rows) arranged apertures, voids or spaces between adjacent spots of toner would result. In other words it is impossible to form continuous lines. Characters and solid area black images formed in such a manner would be similar in appearance to those formed by a dot matrix printer without a double striking feature for producing near letter quality characters.

BRIEF DESCRIPTION OF THE INVENTION

Near letter quality (NLQ) characters are formed using direct electrostatic printing (DEP) by providing a printhead structure which eliminates the voids discussed above when printing both line and solid black area images.

To solve the problem I have provided, as disclosed herein, a printhead structure which includes a minimum of three equally spaced rows of equally spaced apertures and preferably four equally spaced rows of equally spaced apertures. The aperture centers of different rows are offset or staggered by one pixel size and the spacing between rows is equal for any two rows. The Uniform staggering and equal displacement of the different rows insures non-banded and non-streaked images.

The number of rows of apertures needed to produce the printhead structure of the present invention can be expressed by the relationship $$n=D/d$$

where n equals the number of rows, D equals the distance between aperture centers and d equals the diameter of a spot of toner. Expressed differently, if n rows are used the distance between adjacent apertures is equal to n times the toner spot diameter (d). The distance between rows is desireably equal to $(n+i)*d$ where i is preferably an interger, for example 1, which facilitates a constant pixel tme in the drive electronics.

DETAILED DESCRIPTION OF THE DRAWINGS

Figure 1:
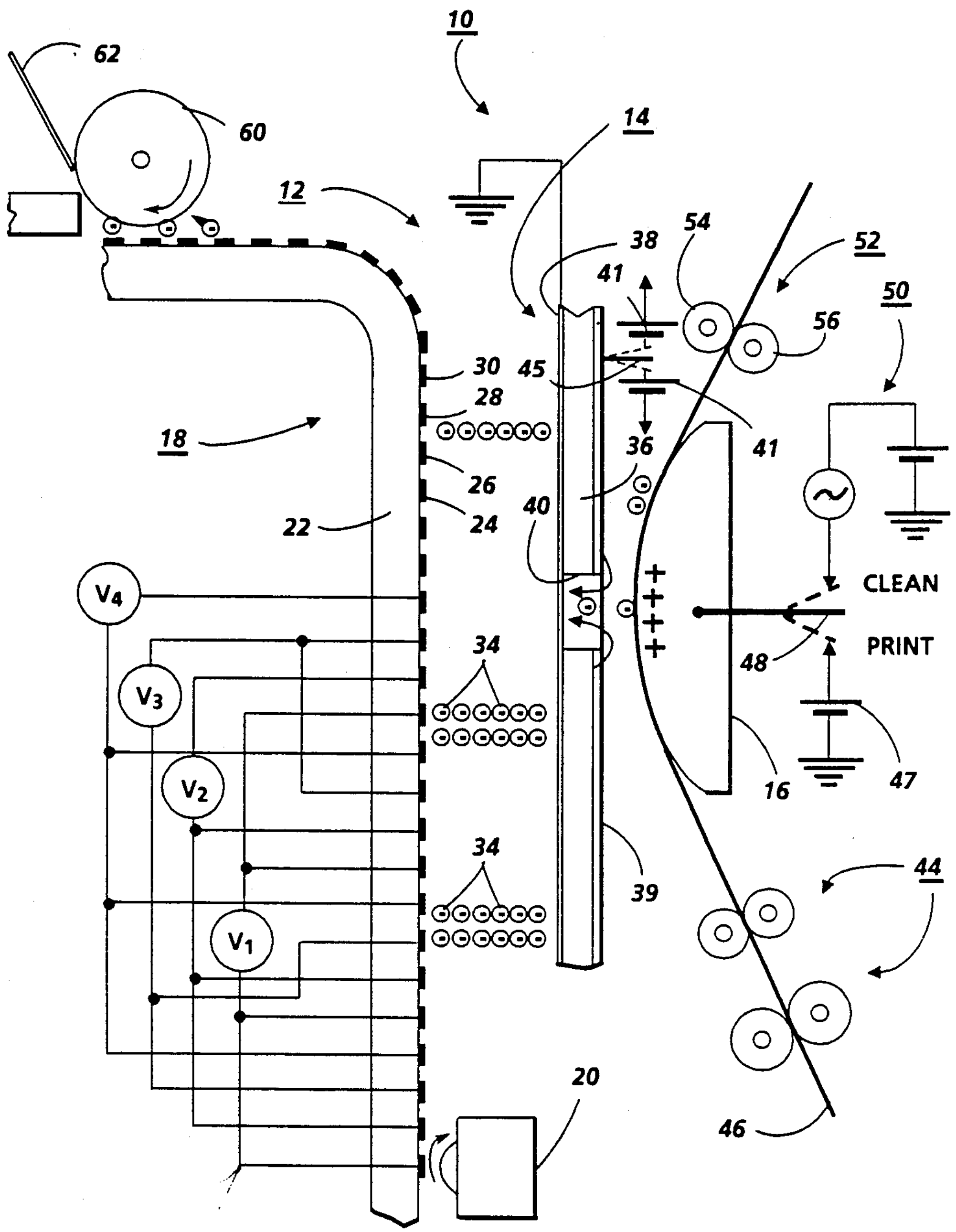
Figure 2:
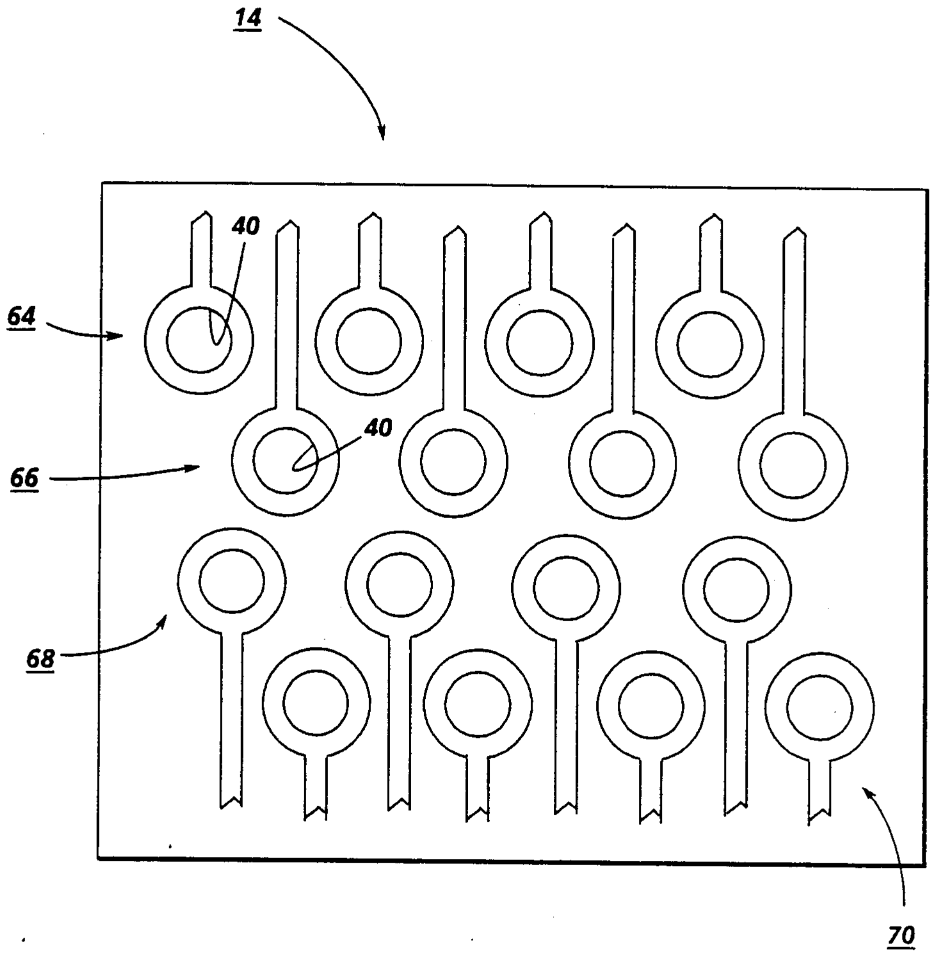

FIG. 1 is a schematic illustration of a printing apparatus representing the present invention; and FIG. 2 is an enlarged plan view of a printhead structure illustrating the arrangement of apertures therein.

DESCRIPTION OF THE PREFERRED EMBODIMENT OF THE INVENTION

Disclosed in FIG. 1 is an embodiment of a direct electrostatic printing apparatus 10 incorporating the invention.

The printing apparatus 10 includes a developer delivery or conveying system generally indicated by reference character 12, a printhead structure 14 and a backing electrode or shoe 16.

The developer delivery system 12 includes a charged toner conveyor (CTC) 18 and a magnetic brush developer supply 20. The charged toner conveyor 18 comprises a base member 22 and an electrode array comprising repeating sets of electrodes 24, 26, 28 and 30 to which are connected A.C. voltage sources $V_1$, $V_2$, $V_3$ and $V_4$ which voltages are phase shifted one from the other so that an electrostatic travelling wave pattern is established.

The effect of the travelling wave patterns established by the conveyor 18 is to cause already charged toner particles 34 delivered to the conveyor via the developer supply 20 to travel along the charged conveyor to an area opposite the printhead apertures where they come under the influence of electrostatic fringe fields emanating from the printhead 14 and ultimately under the influence of the field created by the voltage applied to the shoe 16.

By way of example, the developer comprises any suitable insulative non-magnetic toner/carrier combination having Aerosil (Trademark of Degussa, Inc.) contained therein in an amount approximately equal to 0.3 to 0.5% by weight and also having zinc stearate contained therein in an amount approximately equal to 0 to 1% by weight.

The printhead structure 14 comprises a layered member including an electrically insulative base member 36 fabricated from a polyimide film having a thickness in the order of 1 to 2 mils (0.025 to 0.50 mm). The base member is clad on the one side thereof with a continuous conductive layer of shield 38 of aluminum which is approximately 1 micron (0.001 mm thick). The opposite side of the base member 36 carries segmented conductive layer 39 thereon which is fabricated from aluminum and has a thickness similar to that of the shield 38. The total thickness of the printhead structure is in the order of 0.001 to 0.002 inch (0.027 to 0.52 mm).

A plurality of holes or apertures 40 (only one of which is shown in FIG. 1) approximately 0.15 mm in diameter are provided in the layered structure in a pattern to be discussed hereinafter in connection with FIG. 2. The apertures form an electrode array of individually addressable electrodes. With the shield grounded and with 0–100 positive volts applied via a DC power source 41 and switch 45 to an addressable electrode, toner is propelled through the aperture associated with that electrode. The apertures extend through the base 36 and the conductive layers 38 and 39.

With a negative 350 volts applied to an addressable electrode via a DC power source 41 and the switch 45 toner is prevented from being propelled through the aperture. Image intensity can be varied by adjusting the voltage on the control electrodes between plus 100 and minus 350 volts. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe is positioned on the opposite side of a plain paper recording medium 46 from the printhead 14 supports the recording medium in an arcuate path in order to provide an extended area of contact between the medium and the shoe.

The recording medium 46 may comprise roll paper or cut sheets of paper fed from a supply tray, not shown. The sheets of paper are spaced from the printhead 14 a distance in the order of 0.003 to 0.030 inch as they pass therebetween. The sheets 46 are transported in contact with the shoe 16 via edge transport roll pairs 44.

During printing the shoe 16 is electronically biased to a dc potential of approximately 400 volts via a dc voltage source 47.

In the event that any wrong sign toner becomes agglomerated on the printhead, switch 48 is periodically actuated between printing of documents such that a dc biased AC power supply 50 is connected to the shoe 16 to effect cleaning of the printhead. The voltage from the source 50 is supplied at a frequency which causes the toner in the gap between the paper and the printhead to oscillate and bombard the printhead.

Momentum transfer between the oscillating toner and any toner on the control electrodes of the printhead caused the toner on the control electrodes to become dislodged. The toner so dislodged is deposited on the substrate subsequently passed over the shoe 16.

At the fusing station, a fuser assembly, indicated generally by the reference numeral 52, permanently affixes the transferred toner powder images to sheet 46. Preferably, fuser assembly 52 includes a heated fuser roller 54 adapted to be pressure engaged with a back-up roller 56 with the toner powder images contacting fuser roller 54. In this manner, the toner powder image is permanently affixed to copy substrate 42. After fusing, a chute, not shown, guides the advancing sheet 42 to catch tray, also not shown, for removal from the printing machine by the operator.

A typical width for each of the electrodes for the travelling wave grid is 1 to 4 mils (0.025 to 0.10 mm). Typical spacing between the centers of the electrodes is twice the electrode width and the spacing between adjacent electrodes is approximately the same as the electrode width. Typical operating frequency is between 1000 and 10,000 Hz for 125 lpi grids 4 mil (0.10 mm) electrodes, the drive frequency for maximum transport rate being 2,000 Hz.

A typical operating voltage is relatively low (i.e. less than the Paschen breakdown value) and is in the range of 30 to 1000 depending on grid size, a typical value being approximately 500 V for a 125 lpi grid. Stated differently, the desired operating voltage is approximately equal to 100 times the spacing between adjacent electrodes.

While the electrodes may be exposed metal such as Cu or Al it is preferred that they be covered or overcoated with a thin oxide or insulator layer. A thin coating having a thickness of about half of the electrode width will sufficiently attenuate the higher harmonic frequencies and suppress attraction to the electrode edges by polarization forces. A slightly conductive over-coating will allow for the relaxation of charge accumulation due to charge exchange with the toner. To avoid excessive alteration of the toner charge as it moves about the conveyor, however, a thin coating of a material which is non-tribo active with respect to the toner is desirable. A weakly tribo-active material which maintains the desired charge level may also be utilized.

A preferred overcoating layer comprises a strongly injecting active matrix such as the disclosed in U.S. Pat. No. 4,515,882 granted in the name of Joseph Mammino et al on or about May 7, 1985 and assigned to the same assignee as the instant application. As disclosed therein, the layer comprises an insulating film forming continuous phase comprising charge transport molecules and finely divided charge injection enabling particles dispersed in the continuous phase. A polyvinylfluoride film available from the E. I. duPont de Nemours and Company under the tradename Tedlar has also been found to be suitable for use as the overcoat.

A biased toner extraction roll 60 is provided adjacent the charged toner transport 18 for removing excess toner from the transport. A scraper blade 62 is provided for removing toner particles from the extraction roll 60. The toner so extracted may be returned to the toner supply in a well known manner, not shown.

As illustrated in the preferred embodiment depicted in FIG. 2, the apertures 42 are contained in four rows 64, 66, 68 and 70. At least three equally spaced rows of equally spaced apertures are necessary but four equally spaced rows are preferred.

The aperture centers of different rows are offset or staggered by one pixel size and the spacing between rows is equal for any two rows. The Uniform staggering and equal displacement of the different rows insures non-banded or non-streaked images.

The number of rows of apertures needed to produce the printhead structure of the present invention can be expressed by the relationship $$n=D/d$$

where n equals the number of rows, D equals the distance between aperture centers and d equals the diameter of a spot of toner. Expressed differently, if n rows are used the distance between adjacent apertures is equal to n times the toner spot diameter (d). The distance between rows is desireably equal to (n+1)*d where i is preferably an interger, for example 1, which facilitates a constant pixel tme in the drive electronics. As noted above, a printhead having apertures with a 0.15 mm diameter deposits toner spots having a diameter of approximately 0.075 mm. Thus, the maximum distance between aperture centers for this arrangement would be n*0.075 mm of 3 (the minimum number of rows)*0.075 mm or 0.225 mm. For four rows of apertures, the center to center spacing would be 4*0.075 mm or 0.03 mm.

While a specific spatial relationship of the rows is depicted in FIG. 2 the rows may rearranged. For example, rows 66 and 68 could be interchanged so long as the apertures are staggered so their centers partition the distance between the centers of apertures of adjacent apertures in a given row equally.

What is claimed is:

1. Direct electrostatic printing apparatus for forming toner images on an image receiving member, said apparatus comprising:

An apertured printhead structure for depositing spots of toner on an imaging surface;

means for causing said printhead structure to deposit spots of toner on an imaging surface in image configuration;

said apertured printhead structure including a plurality of equally spaced rows of equally spaced apertures, said plurality of rows being spatially arranged and equal to a number sufficient to insure printing of images without voids between spots of toner, said number being equal to at least three.

2. Apparatus according to claim 1 wherein the number of rows is equal to the distance between aperture centers divided by the diameter of a spot of toner.

3. Apparatus according to claim 1 wherein said plurality of rows comprises first, second, third and fourth rows of apertures;

and wherein the apertures of one row are staggered relative to the apertures of another row.

4. Apparatus according to claim 3 wherein the degree of stagger is approximately equal to the size of a spot of toner.

5. Apparatus according to claim 2 wherein said apertures have a circular cross section.

6. Apparatus according to claim 4 wherein said apertures have a diameter of 0.15 mm.

7. Apparatus according to claim 3 wherein said apertures have a circular cross section.

8. Apparatus according to claim 7 wherein said apertures have a diameter of 0.15 mm.

9. Apparatus according to claim 8 wherein the spots of toner deposited by each aperture is approximately 0.0750 mm.

* * * * *